United States Patent [19]

Campbell

[11] 3,870,686
[45] Mar. 11, 1975

[54] ARYLENE SULFIDE POLYMERS
[75] Inventor: Robert W. Campbell, Bartlesville, Okla.
[73] Assignee: Phillips Petroleum Company, Bartlesville, Okla.
[22] Filed: Nov. 19, 1973
[21] Appl. No.: 416,771

[52] U.S. Cl. ............... 260/79.1, 117/161 R, 260/79
[51] Int. Cl. ........................................... C08g 23/00
[58] Field of Search ............................ 260/79, 79.1

[56] References Cited
UNITED STATES PATENTS

| | | | |
|---|---|---|---|
| 3,432,468 | 3/1969 | Gabler | 260/79 |
| 3,538,166 | 11/1970 | Campbell et al. | 260/609 E |
| 3,547,887 | 12/1970 | Gabler et al. | 260/79 |
| 3,594,446 | 7/1971 | Gabler et al. | 260/79 |
| 3,706,702 | 12/1972 | Studinka et al. | 260/79 |
| 3,730,949 | 5/1973 | Jungblut | 260/79.1 |

*Primary Examiner*—Melvyn I. Marquis

[57] ABSTRACT

A method of producing arylene sulfide polymers employing (1) polyhalo-substituted aromatic compounds; (2) mercaptans, mercaptides, or sulfides having an alpha and/or beta activating substituent; (3) bases selected from the hydroxides of lithium, sodium, potassium, rubidium, cesium, magnesium, calcium, strontium and barium and the carbonates of sodium, potassium, rubidium and cesium; and, (4) organic amides.

26 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of this invention, arylene sulfide polymers are produced by reacting at least one polyhalo-substituted aromatic compound wherein the halogen atoms are attached to aromatic ring carbon atoms with a mixture in which at least one organic sulfur-containing compound selected from mercaptans, mercaptides, and sulfides, each having an alpha and/or beta activating substituent, at least one base selected from the hydroxides of lithium, sodium, potassium, rubidium, cesium, magnesium, calcium, strontium, and barium and the carbonates of sodium, potassium, rubidium, and cesium and at least one organic amide are contacted.

The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. Mixtures of polyhalo-substituted aromatic compounds such as dihalobenzenes can be used, for example, a mixture comprising at least one m-dihalobenzene and at least one p-dihalobenzene.

Organic sulfur-containing compounds selected from mercaptans, mercaptides, and sulfides, each having an alpha and/or beta activating substituent, which can be used in the method of this invention can be represented by the formula

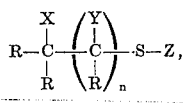

wherein each R is selected from hydrogen and monovalent hydrocarbon radicals selected from alkyl, cycloalkyl, aryl, and combinations thereof such as alkaryl, aralkyl, and the like having one to about 16 carbon atoms; $n$ is 0 or 1; X and Y are each selected from R and Q, at least one of X and Y being Q, with the proviso that when $n$ is 0, X is Q, and when $n$ is 1 and Y is R, at least one R attached to

is hydrogen; Q is an activating substituent selected from —CN,

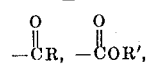

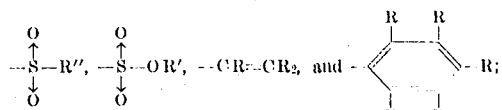

R' is selected from ($a$) monovalent hydrocarbon radicals selected from alkyl, cycloalkyl, aryl, and combinations thereof such as alkaryl, aralkyl, and the like, having one to about 16 carbon atoms and ($b$) M/$y$, where M is a metal selected from lithium, sodium, potassium, rubidium, cesium, magnesium, calcium, strontium, and barium, and $y$ is the valence of the metal M; R'' is selected from monovalent hydrocarbon radicals selected from alkyl, cycloalkyl, aryl, and combinations thereof such as alkaryl, aralkyl, and the like having one to about 16 carbon atoms; Z is selected from hydrogen, M/$y$, and

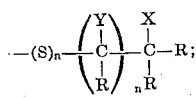

and the total number of carbon atoms in each molecule of each of said organic sulfur-containing compounds is within the range of one to about 40.

Some examples of said organic sulfur-containing compounds which can be used in the process of this invention include monosodium salt of mercaptoacetic acid, disodium salt of mercaptoacetic acid, monosodium salt of 2-mercaptopropionic acid, disodium salt of 2-mercaptopropionic acid, monosodium salt of 3-mercaptopropionic acid, disodium salt of 3-mercaptopropionic acid, disodium salt of mercaptosuccinic acid, trisodium salt of mercaptosuccinic acid, p-dodecylbenzyl mercaptan, sodium salt of p-dodecylbenzyl mercaptan, 3-mercaptopropionitrile, (2-mercaptoethyl)benzene, benzyl mercaptan, allyl mercaptan, dilithium salt of 3-cyano-3-mercaptopropionic acid, 2-ethyl-3-mercaptobutyraldehyde, isopropyl 1-mercaptopropyl ketone, cyclohexyl 1-isopropyl-2-mercaptopentyl ketone, methyl 2-butyl-3-mercaptotridecanoate, hexadecyl 2-hexyl-2-mercaptooctadecanoate, potassium salt of phenyl 2-cyclopentyl-3-mercaptopropionate, methyl α-mercaptobenzyl sulfone, calcium salt of hexyl 2-mercaptoethyl sulfone, cyclooctyl mercaptomethyl sulfone, o-tolyl 1-(mercaptomethyl)hexyl sulfone, dipotassium salt of mercaptomethanesulfonic acid, dicalcium salt of 1-(mercaptomethyl)butanesulfonic acid, methyl 1-mercaptoethanesulfonate, rubidium salt of cycloheptyl 1-p-tolyl-2-mercaptoethanesulfonate, benzyl mercaptomethanesulfonate, strontium salt of 2,3-dimethyl-5-mercapto-6-phenyl-2-hexene, cesium salt of 2-phenyl-3-mercaptopropene, barium salt of 2-(p-tolyl)ethyl mercaptan, 1-benzyl-2-(mercaptomethyl)-benzene, dibenzyl sulfide, dibenzyl disulfide, diallyl sulfide, bis(2-acetylpropyl) disulfide, bis(1-phenyl-2-nonanoylpentyl) sulfide, bis(1-cyclohexyl-1-p-toluoyl-2-methylpropyl) disulfide, rubidium salt of bis(1-methyl-1,2-dicarboxyoctyl) sulfide, strontium salt of bis(1-carboxy-2-phenylethyl) disulfide, bis(1-ethyl-2- isobutoxycarbonylethyl) sulfide, bis(1-cyclopentyloxycarbonylpentyl) disulfide, bis(2-p-tolyl-2-m-tolyoxycarbonylethyl) sulfide, bis(1-isopropylsulfonylheptadecyl) disulfide, bis(2-hexadecylsulfonylethyl) sulfide, bis(1-phenylsulfonylhexyl) disulfide, bis(2-phenyl-2-benzylsulfonylethyl) sulfide, cesium salt of bis(sulfomethyl) disulfide, barium salt of bis(2-sulfopropyl) sulfide, bis(1-heptyloxysulfonylnonyl) disulfide, bis(1-methyl-2-cyclopentyl-2-phenoxysulfonylethyl) sulfide, bis(2-nonadecenyl) disulfide, bis[2-(2-isopropyl-5-hexylphenyl)ethyl] sulfide, allyl benzyl disulfide, and the like, and mixtures thereof. If desired, those of said organic sulfur-containing compounds which are salts of mercaptans, salts of carboxylic acids, or salts of sulfonic acids can be prepared in situ by reaction of base with the corresponding mercaptan, carboxylic acid, or sulfonic acid.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof. If desired, the hydroxide can be produced in situ by the reaction of the corresponding oxide with water.

The organic amides used in the method of this invention should be substantially liquid at the reaction temperatures and pressures employed. The amides can be cyclic or acyclic and can have one to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the organic sulfur-containing compound as defined herein, the base and the organic amide or which can be present in a composite formed from the organic sulfur-containing compound, the base and the organic amide can be removed, for example, by distillation, prior to conducting the polymerization reaction. Such water can be present as an impurity, as a solvent or diluent, as water of hydration or as water produced in a neutralization reaction. Regardless of whether a water removal step is employed, at least a portion of the composition formed from the polyhalo-substituted aromatic compound, the organic sulfur-containing compound, the base and the organic amide is maintained at polymerization conditions to produce the arylene sulfide polymer.

The ratio of reactants can vary considerably but about 0.75 to about 2, and preferably about 0.8 to about 1.2, gram-moles of the polyhalo-substituted aromatic compound will generally be employed per gram-atom of divalent sulfur in the organic sulfur-containing compound. The base generally will be employed in an amount within the range of from about 1.1 to about 5, and preferably from about 1.5 to about 3, gram-equivalents per gram-atom of divalent sulfur in the organic sulfur-containing compound, with the proviso that when the organic sulfur-containing compound is employed as a metal mercaptide, the base requirement is reduced by 1 gram-equivalent per gram-atom of divalent sulfur in the organic sulfur-containing compound. As used herein, 1 gram-equivalent of the hydroxides of magnesium, calcium, strontium and barium represents the same amount as 1/2 gram-mole of these substances, whereas for the hydroxides of lithium, sodium, potassium, rubidium, and cesium, or for the carbonates of sodium, potassium, rubidium, and cesium, the amount represented by 1 gram-equivalent is considered to be the same as that represented by 1 gram-mole.

The amount of organic amide employed can also vary over a wide range but will generally be within the range of from about 100 grams to about 2,500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

The previous statements are based upon the following examples.

EXAMPLES

In the following examples, values for glass transition temperature ($T_g$), and crystalline melting point, ($T_m$), were determined by differential thermal analysis. Values for inherent viscosity were determined at 206° C. in 1-chloronaphthalene at a polymer concentration of 0.4 g/100 ml solution.

Examples 1 through 5 illustrate the use of mercaptans containing $\alpha$ or $\beta$ activating groups as the source of sulfur.

EXAMPLE I

To a stirred autoclave were charged 106.1 g (1.0 gram-mole) of 2-mercaptopropionic acid, 123.8 g (3.0 gram-moles, 97 percent assay) of NaOH and 276.7 g of N-methyl-2-pyrrolidone (NMP). The mixture was heated under a slow $N_2$ flush to 185° C. in 1 hour and 25 minutes. The distillate (34 ml) contained 28.1 g of water.

The mixture was cooled to 175° C. and a solution of 149.9 g (1.02 gram-moles) of 1,4-dichlorobenzene (DCB) in 50 g of NMP was added. The system was closed off under 20 psig $N_2$ and heated to 245° C. in 18 minutes. After heating 3 hours at this temperature (pressure 65–225 psig) the autoclave contents were cooled to room temperature.

The brown product was washed twice with 1-liter portions of water and four times with 1-liter portions of methanol. The product was dried in a vacuum oven at 80° C.

The resulting poly(p-phenylene sulfide) was recovered in an amount of 64 g, 59.2 percent yield. It had an inherent viscosity of 0.04, a $Tg$ of 41° C. and a $Tm$ of 271° C.

EXAMPLE II

To a stirred autoclave were charged 106.1 g (1.0 gram-mole) of 3-mercaptopropionic acid, 123.8 g (3.0 gram-moles, 97 percent assay) of NaOH and 276.7 g of NMP. Dehydration for 1 hour and 55 minutes to 196° C. yielded 37 ml of distillate containing 22.3 g of water. 1,4-Dichlorobenzene was charged as in Example I and a similar polymerization at a pressure of 65–120 psig yielded a dark poly(p-phenylene sulfide) product which, after washing with hot water and drying at 80° C. in a vacuum oven, amounted to 84.5 g, 78.1 percent yield, and had an inherent viscosity of 0.09, a $Tg$ of 65° C. and a $Tm$ of 286° C.

EXAMPLE III

To a stirred autoclave were charged 150.2 g (1.0 gram-mole) of mercaptosuccinic acid, 163.3 g (4.0 gram-moles, 98 percent assay) NaOH, and 275 g of NMP. The reactor was heated to 196° C. in 2 hours and 13 minutes under a slow nitrogen flush as 52 ml of distillate was collected. A solution of 151 g (1.03 gram-moles) of DCB in 52 g of NMP was charged and the mixture was heated to 244° C. in 13 minutes at which temperature it was maintained for 3 hours, the pressure being 35–70 psig.

The poly(p-phenylene sulfide) product was washed in hot water and dried in a vacuum oven at 100° C. to give 29.2 g of product representing a yield of 27 percent and having an inherent viscosity of 0.02.

EXAMPLE IV

To a stirred autoclave were charged 115.1 g (1.0 gram-mole, 80 percent assay) of mercaptoacetic acid, 122.6 g (3 gram-moles, 98 percent assay) of NaOH, and 275 g of NMP. Dehydration for 1 hour and 33 minutes to 196° C. yielded 66 ml of distillate.

DCB was charged as in Example III and a similar polymerization at a pressure from 43 to 150 psig yielded a product which was washed twice with water and twice with methanol. The poly(p-phenylene sulfide) product was dried in a vacuum oven at 100° C. and amounted to 13.4 g, a 12.4 percent yield, having an inherent viscosity of 0.05.

EXAMPLE V

To a stirred autoclave were charged 46.4 g (0.173 gram-mole, 96.7 percent assay) p-dodecylbenzyl mercaptan, 14.9 g (0.365 gram-mole, 98 percent assay) NaOH and 275 g NMP. Dehydration for 35 minutes up to 196° C. yielded 3 ml of distillate.

A solution of 27.8 g (0.189 gram-mole) of DCB in 52 g of NMP was added and the mixture closed off under 5 psig $N_2$ and heated to 246° C. in 37 minutes. After heating for 3 hours at this temperature (a pressure of 25–27 psig), the reactor was cooled to room temperature. The product was washed alternately in methanol, hot water, methanol and hot water. It was dried in a vacuum oven at 100° C.

The yield was 16.0 g (86 percent) of poly(p-phenylene sulfide) having an inherent viscosity of 0.01.

The above examples all employed sulfur-donor compounds having $\alpha$ or $\beta$ activating groups. Example VI demonstrates the results obtained employing a mercaptan lacking $\alpha$ or $\beta$ activating groups.

EXAMPLE VI

To a stirred autoclave were charged 202.4 g (1.0 gram-mole) of dodecyl mercaptan, 81.89 g (2.0 gram-moles, 98 percent assay) NaOH and 275 g of NMP. Dehydration was conducted for 1 hour, 27 minutes at temperatures up to 196° C. and produced 11 ml of a two-layered distillate. A solution of 151.9 g (1.03 gram-moles) DCB in 52 g of NMP was charged and the system was closed off under 10 psig $N_2$ and heated to 245° C. in 35 minutes. After heating 3 hours at 245° C., the contents of the autoclave were cooled to room temperature.

The product was washed twice with warm methanol and twice with water.

This product was shown by proton nuclear magnetic resonance to be principally 1,4-bis(dodecylthio)benzene with small amounts of mercaptan, DCB and 1-chloro-4-(dodecylthio)benzene with no detectable quantity of poly(p-phenylene sulfide) being present.

The following two runs demonstrate the use of dibenzyl sulfide and dibenzyl disulfide.

EXAMPLE VII

To a stirred autoclave were charged 32.9 g (0.80 gram-mole) of NaOH (97.7 percent assay) 85.7 g (0.40 gram-mole) of dibenzyl sulfide and 100 g of NMP. The mixture was heated to 203° C. under a slow nitrogen flush in 1 hour and 45 minutes and a trace of distillate was collected. A solution of 60.0 g (0.408 gram-mole) of DCB in 30.7 g of NMP was added and the mixture was heated under a $N_2$ atmosphere to 245° C. in 10 minutes and maintained at that temperature for 3 hours at a pressure of 55–115 psig. Thereafter the mixture was cooled to room temperature.

The poly(p-phenylene sulfide) product was washed twice with 1-liter portions of methanol and four times with 1-liter portions of hot water. After drying in a vacuum oven at 50° C., 27.6 g of polymer (63.9 percent yield) was recovered having an inherent viscosity of 0.02 and a $Tm$ of 245° C.

EXAMPLE VIII

To a stirred autoclave were charged 90.6 g (2.2 gram-moles) of NaOH (97.7 percent assay), 147.84 g (0.60 gram-mole) of dibenzyl disulfide and 276.7 g of NMP. The mixture was heated under a slow $N_2$ flush to 205° C. in 1 hour and 25 minutes and 3 ml of distillate was collected. A solution of 149.9 g (1.02 gram-moles) of DCB in 50 g of NMP was added and the resulting mixture was heated under a nitrogen atmosphere at 245° C. in 15 minutes. After heating for 3 hours at a pressure of 45–125 psig, the autoclave was cooled to room temperature.

After washing twice with 1-liter portions of methanol, four times with 1-liter portions of hot water and drying in an oven at 50° C., 102.8 g (93.2 percent yield) of poly(p-phenylene sulfide) was recovered having an inherent viscosity of 0.04, a $Tg$ of 75° C. and a $Tm$ of 285° C.

It is within the scope of the invention to bring the polyhalo-substituted aromatic compound, the organic sulfur-containing compound, the base and the organic amide into contact in any order.

Also, it is within the scope of this invention to remove water from aby combination of the aforesaid compounds.

It will be evident from the foregoing that various modifications can be made to the method of this invention. Such are considered, however, to be within the scope thereof.

What is claimed is:

1. A method of producing a polymer which comprises:
   a. forming a composition by contacting at least one polyhalo-substituted aromatic compound wherein the halogen atoms are attached to aromatic ring carbon atoms, at least one organic amide, at least one organic sulfur-containing compound selected from the group consisting of mercaptans, mercaptides and sulfides, each having an alpha or a beta activating substituent, and at least one base selected from the hydroxides of lithium, sodium, potassium, rubidium, cesium, magnesium, calcium, strontium and barium and the carbonates of sodium, potassium, rubidium and cesium; and,
   b. maintaining at least a portion of said composition at polymerization conditions to produce said polymer.

2. The method of claim 1 in which said polyhalo-substituted aromatic compound is employed in an amount within the range of from about 0.75 to about 2 gram-moles per gram-atom of divalent sulfur in said organic sulfur-containing compound.

3. The method of claim 1 in which said base is employed in an amount within the range of from about 1.1 to about 5 gram-equivalents per gram-atom of divalent sulfur in said organic sulfur-containing compound with the proviso that when the organic sulfur-containing compound is employed as a metal mercaptide, the base requirement is reduced by one gram-equivalent per gram-atom of divalent sulfur in said organic sulfur-containing compound.

4. The method of claim 2 in which said organic amide is employed in an amount within the range of from about 100 grams to about 2,500 grams per gram-mole of polyhalo-substituted aromatic compound.

5. The method of claim 1 in which said polyhalo-substituted aromatic compound is 1,4-dichlorobenzene, said organic amide is N-methyl-2-pyrrolidone, and said base is sodium hydroxide.

6. The method of claim 5 in which said organic sulfur-containing compound is a sodium salt of 2-mercaptopropionic acid.

7. The method of claim 5 in which said organic sulfur-containing compound is a sodium salt of 3-mercaptopropionic acid.

8. The method of claim 5 in which said organic sulfur-containing compound is a sodium salt of mercaptosuccinic acid.

9. The method of claim 5 in which said organic sulfur-containing compound is a sodium salt of mercaptoacetic acid.

10. The method of claim 5 in which said organic sulfur-containing compound is p-dodecylbenzyl mercaptan or sodium salt thereof.

11. The method of claim 1 in which water is removed from said composition prior to maintaining said composition at polymerization conditions.

12. A method of producing a polymer which comprises:
   a. contacting at least one organic amide, at least one organic sulfur-containing compound selected from the group consisting of mercaptans, mercaptides and sulfides, each having an alpha or beta activating substituent, and at least one base selected from the hydroxides of lithium, sodium, potassium, rubidium, cesium, magnesium, calcium, strontium and barium and the carbonates of sodium, potassium, rubidium and cesium to form a first composition;
   b. contacting at least a portion of said first composition with at least one polyhalo-substituted aromatic compound wherein the halogen atoms are attached to aromatic ring carbon atoms to form a second composition; and,
   c. maintaining at least a portion of said second composition at polymerization conditions to form said polymer.

13. The method of claim 12 in which said polyhalo-substituted aromatic compound is employed in an amount within the range of from about 0.75 to about 2 gram-moles per gram-atom of divalent sulfur in said organic sulfur-containing compound.

14. The method of claim 12 in which said base is employed in an amount within the range of from about 1.1 to about 5 gram-equivalents per gram-atom of divalent sulfur in said organic sulfur-containing compound with the proviso that when the organic sulfur-containing compound is employed as a metal mercaptide, the base requirement is reduced by one gram-equivalent per gram-atom of divalent sulfur in said organic sulfur-containing compound.

15. The method of claim 13 in which said organic amide is employed in an amount within the range of from about 100 grams to about 2,500 grams per gram-mole of polyhalo-substituted aromatic compound.

16. The method of claim 12 in which said polyhalo-substituted aromatic compound is 1,4-dichlorobenzene, said organic amide is N-methyl-2-pyrrolidone, and said base is sodium hydroxide.

17. The method of claim 16 in which said organic sulfur-containing compound is a sodium salt of 2-mercaptopropionic acid.

18. The method of claim 16 in which said organic sulfur-containing compound is a sodium salt of 3-mercaptopropionic acid.

19. The method of claim 16 in which said organic sulfur-containing compound is a sodium salt of mercaptosuccinic acid.

20. The method of claim 16 in which said organic sulfur-containing compound is a sodium salt of mercaptoacetic acid.

21. The method of claim 16 in which said organic sulfur-containing compound is p-dodecylbenzyl mercaptan or sodium salt thereof.

22. The method of claim 12 in which water is removed from said first composition prior to maintaining said second composition at polymerization conditions.

23. The method of claim 5 in which said organic sulfur-containing compound is dibenzyl sulfide.

24. The method of claim 5 in which said organic sulfur-containing compound is dibenzyl disulfide.

25. The method of claim 16 in which said organic sulfur-containing compound is dibenzyl sulfide.

26. The method of claim 16 in which said organic sulfur-containing compound is dibenzyl disulfide.

* * * * *